(12) United States Patent
McGregor et al.

(10) Patent No.: US 8,843,606 B2
(45) Date of Patent: Sep. 23, 2014

(54) METHOD, SYSTEM AND APPARATUS FOR MANAGING LOAD IN A SERVER

(75) Inventors: John Andrew McGregor, Ottawa (CA); Douglas Heath Patriarche, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 804 days.

(21) Appl. No.: 12/766,713

(22) Filed: Apr. 23, 2010

(65) Prior Publication Data

US 2011/0264778 A1    Oct. 27, 2011

(51) Int. Cl.
  *G06F 15/173*   (2006.01)
  *G06F 9/50*    (2006.01)
  *H04L 12/801*   (2013.01)
  *H04L 29/08*   (2006.01)

(52) U.S. Cl.
  CPC .............. *G06F 9/5016* (2013.01); *H04L 47/19* (2013.01); *Y02B 60/142* (2013.01); *H04L 67/325* (2013.01)
  USPC .......................................... 709/223; 717/171

(58) Field of Classification Search
  CPC .................................................... H04L 67/325
  USPC ......................................... 709/223; 717/171
  See application file for complete search history.

(56) References Cited

U.S. PATENT DOCUMENTS

| | | | |
|---|---|---|---|
| 2004/0177353 A1* | 9/2004 | Rao ............................... | 717/171 |
| 2008/0046587 A1* | 2/2008 | Sakoh et al. .................. | 709/234 |
| 2008/0113656 A1 | 5/2008 | Lee et al. | |
| 2009/0207769 A1 | 8/2009 | Park et al. | |

OTHER PUBLICATIONS

European Patent Application No. 10160876.8 Search Report mailed Oct. 4, 2010.

* cited by examiner

*Primary Examiner* — Glenford Madamba
(74) *Attorney, Agent, or Firm* — Perry + Currier Inc.

(57) ABSTRACT

A method, apparatus, and system for managing load in a server are provided. The server performs events for a plurality of electronic communication devices, each of the devices enabled to transmit to the server, at a respective given time and at a respective given frequency, a request to perform a respective event. The server receives the requests and determines that its load is above a threshold load value during a given time period when the requests arrive. In response, for a subset of the devices, the server transmits a delay time to each electronic communication device in the subset. The delay time causes each device in the subset to change the respective given time to a respective new time comprising the delay time added to the respective given time such that a next request is transmitted from each device in the subset to the server at the respective new time.

12 Claims, 7 Drawing Sheets

METHOD, SYSTEM AND APPARATUS FOR MANAGING LOAD IN A SERVER

FIELD

The specification relates generally to client-server environments, and more specifically to a method, system and apparatus for managing load in a server.

BACKGROUND

Servers can get overloaded at peak periods when many clients request events at similar times. As such, the servers are typically configured for peak periods leading to unused capacity at off-peak periods.

BRIEF DESCRIPTIONS OF THE DRAWINGS

Implementations are described with reference to the following figures, in which.

DETAILED DESCRIPTION OF THE IMPLEMENTATIONS

A first aspect of the specification provides a method for managing load in a server. The server is enabled to perform requested events for a plurality of electronic communication devices. Each of the plurality of electronic communication devices is enabled to transmit to the server, at a respective given time and at a respective given frequency, a request to perform a respective event. The method comprises receiving a plurality of requests at the server to perform the requested events from the plurality of electronic communication devices in a one-to-one relationship. The method further comprises determining that the load on the server is above a threshold load value during a given time period when the plurality of requests are received at the server. The method further comprises, in response to said determining, transmitting a delay time to each of a subset of said plurality of electronic communication device, the delay time causing each electronic communication device in the subset to change the respective given time to a respective new time based on the delay time such that a next request is transmitted from each the electronic communication device in the subset to the server at the respective new time.

The delay time can comprise a given length of time and the new time can comprise the delay time added to the respective given time.

The delay time can comprise an absolute time value, and the new time can comprise the absolute time value.

The method can further comprise determining that the load on the server is below the threshold load value during the given time period, and in response not transmitting the delay time.

The method can further comprise repeating the determining step and the transmitting step until the load is distributed across a second given period of time such that the load is below the threshold load value across the second period of time, the second given period of time being longer than the given period of time.

The method can further comprise selecting the subset of the plurality of electronic communication devices based on at least one of: selecting a percentage of the plurality of requests; randomly selecting; or selecting a priority assigned to at least one of the plurality of electronic communication devices.

Determining that the load on the server is above the threshold load value can comprise at least one of: determining that the server is busy in the given time period; determining that a number of the plurality of requests arriving at the server in the given time period is above a given threshold number; or determining that a percentage of resources in use at the server in the given time period is above a given threshold percentage.

The delay time can be a same predetermined value for each electronic communication device in the subset.

The delay time can be selected from one of a plurality of values for each the electronic communication device in the subset.

The method can further comprise performing the respective events associated with respective requests.

Each of the requested events can comprise at least one of a backup event, a software updated event, or a synchronization event.

A second aspect of the specification provides a system for managing load. The system comprises a plurality of communication devices and a server in communication with the plurality of communication devices. The server is enabled to: receive a plurality of requests to perform the requested events from the plurality of electronic communication devices in a one-to-one relationship; determine that the load on the server is above a threshold load value during a given time period when the plurality of requests are received at the server; and in response to the determining, transmit a delay time to each of a subset of the plurality of electronic communication devices. Each of the plurality of communication devices is enabled to: transmit a respective request to the server to perform a respective requested event at respective given time and at respective given frequency; in response to transmitting the respective request, receive a respective delay time from the server; and change a respective given time to a respective new time based on the respective delay time such that a next request transmitted to the server occurs at the respective new time.

A third aspect of the specification provides a server for managing load. The server comprises a processing unit interconnected with a communications interface and a memory device. The processing unit is enabled to: receive a plurality of requests, via the communications interface, to perform the requested events from the plurality of electronic communication devices in a one-to-one relationship; determine that the load on the server is above a threshold load value during a given time period when the plurality of requests are received at the server; and in response to the determining, transmit a delay time to each of a subset of the plurality of electronic communication devices, the delay time causing each the electronic communication device in the subset to change the respective given time to a respective new time based on the delay time such that a next request is transmitted from each the electronic communication device in the subset to the server at the respective new time.

The delay time can comprise a given length of time and the new time can comprise the delay time added to the respective given time.

The delay time can comprise an absolute time value, and the new time can comprise the absolute time value.

The processing unit can be further enabled to determine that the load on the server is below the threshold load value during the given time period, and in response not transmit the delay time.

The processing unit can be further enabled to repeat the determine step and the transmit step until the load is distributed across a second given period of time such that the load is below the threshold load value across the second period of time, the second given period of time being longer than the given period of time.

The processing unit can be further enabled to select the subset of the plurality of devices based on at least one of: selecting a percentage of the plurality of requests; randomly selecting; or selecting based on a priority assigned to respective ones of the plurality of electronic communication devices.

Determining that the load on the server is above the threshold load value can comprise at least one of: determining that the server is busy in the given time period; determining that a number of the plurality of requests arriving at the server in the given time period is above a given threshold number; or determining that a percentage of resources in use at the server in the given time period is above a given threshold percentage.

The delay time can be a same predetermined value for each the electronic communication device in the subset.

The delay time can be selected from one of a plurality of values for each the electronic communication device in the subset.

The processing unit can be further enabled to perform the respective events associated with respective requests.

Each of the requested events can comprise at least one of a backup event, a software updated event or a synchronization event.

A fourth aspect of the specification provides a method implementable in each of a plurality of electronic communication devices. The method comprises transmitting a request to a server to cause the server to perform a respective requested event, the request transmitted at a given time and at a given frequency stored in a respective memory device of each respective electronic communication device. The method further comprises responsively receiving a delay time from the server. The method further comprises changing the given time to a new time based on the delay time such that a next request transmitted to the server occurs at the new time.

A fifth aspect of the specification provides an electronic communication device for managing load in a server enabled to perform requested events for a plurality of electronic communication devices. The electronic communication device comprises a processing unit interconnected with a memory device and a communication interface. The memory device is enabled to store a given time and a given frequency for transmitting a request to the server to cause the server to perform a requested event. The processing unit enabled to: transmit the request to the server to at the given time and at the given frequency via the communication interface; receive a delay time from the server via the communication interface; and change the given time to a new time based on the delay time such that a next request transmitted to the server occurs at the new time.

A sixth aspect of the specification provides a computer program product, comprising a computer usable medium having a computer readable program code adapted to be executed to implement a method for managing load in a server enabled to perform requested events for a plurality of electronic communication devices, each of the plurality of electronic communication devices enabled to transmit to the server, at a respective given time and at a respective given frequency, a request to perform a respective event, the method implementable at the server, the method comprising: receiving a plurality of requests to perform the requested events from the plurality of electronic communication devices in a one-to-one relationship; determining that the load on the server is above a threshold load value during a given time period when the plurality of requests are received at the server; and in response to the determining, transmitting a delay time to each of a subset of the plurality of electronic communication devices, the delay time causing each the electronic communication device in the subset to change the respective given time to a respective new time based on the delay time such that a next request is transmitted from each the electronic communication device in the subset to the server at the respective new time.

A seventh aspect of the specification provides a computer program product, comprising a computer usable medium having a computer readable program code adapted to be executed to implement a method for managing load in a server enabled to perform requested events for a plurality of electronic communication devices, the method implementable in each of the plurality of electronic communication devices, the method comprising: transmitting a request to the server to cause the server to perform a respective requested event, the request transmitted at a given time and at a given frequency stored in a respective memory device of each respective electronic communication device; responsively receiving a delay time from the server; and changing the given time to a new time based on the delay time such that a next request transmitted to the server occurs at the new time.

Figure 1:
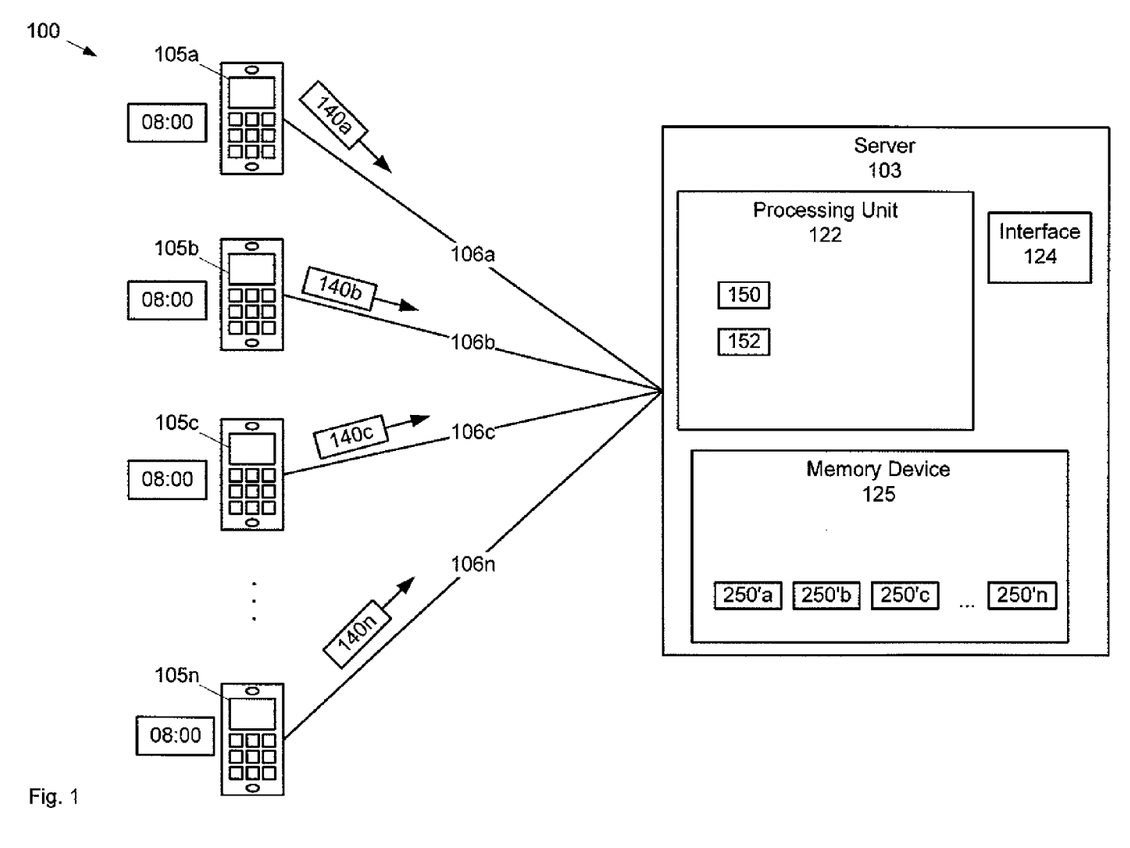
FIG. 1 depicts a block diagram of a system for managing load on a server, according to non-limiting implementations.

FIG. 1 depicts a system 100 for managing load in a server 103, according to non-limiting implementations. Server 103 is enabled for communication with a plurality of electronic communication devices 105a, 105b, 105c . . . 105n (collectively referred to as electronic communication devices 105 or devices 105, and individually referred to as an electronic communication device 105 or a device 105), via respective links 106a, 106b, 106c . . . 106n (collectively links 106, and individually as a link 106). While devices 105 are depicted, it is appreciated that system 100 can comprise any suitable number of devices 105 including but not limited to one device 105, millions of device 105 or any suitable number of devices 105. Furthermore, while one server 103 is depicted, it is appreciated that system 100 can be scaled up such that system 100 comprises any suitable number of servers similar to server 103 in communication with any suitable number of devices 105. For example, thousands of servers similar to server 103 can be in communication with millions of device 105. In implementations where there are more than one server and more than one device 105, then each device 105 can be associated with a given server and/or the association can be dynamically varied as desired to distribute load between servers. The present application addresses a problem of managing load on a particular server 103.

Exemplary components of server 103 are depicted in FIG. 1, comprising a processing unit 122 interconnected with a communication interface 124, and a memory device 125 (for example via a computing bus, not depicted).

Figure 2:
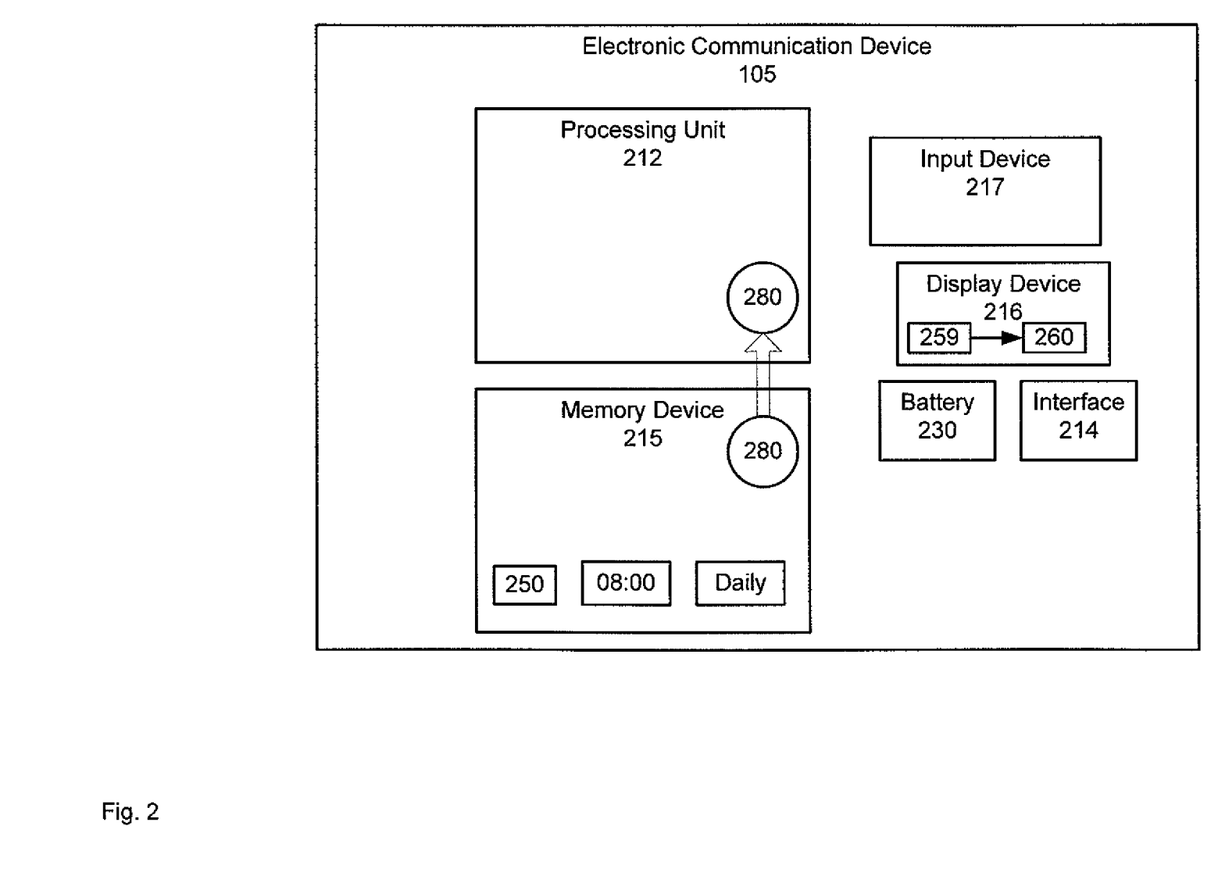
FIG. 2 depicts a block diagram of an electronic communication device for managing load on a server, according to non-limiting implementations.

As depicted in FIG. 2, according to non-limiting implementations, each device 105 comprises a processing unit 212 interconnected with a communication interface, a memory device 215, a display device 216, an input device 217, and a multimedia device 220, all in communication, for example, via a computing bus (not depicted), and powered by a battery 230. Furthermore, each device 105 can be different or similar as desired. For example, each device 105 can be different models and/or from different manufacturers, and the protocols and operating systems used to communicate between elements within each device 105 can be different or similar as desired.

With reference to FIGS. 1 and 2, generally each device 105 is enabled to transmit a respective request 140a, 140b, 140c . . . 140n (collectively requests 140, and individually as a request 140) to server 103 via respective links 106. For example, each request 140 can be for at least one of a back-up event, a software update event, a synchronization event, or any other suitable event performed by server 103. Each request 140 then triggers server 103 to perform the requested event, such as communicating with a respective device 105 to perform the back-up, synchronization, or the like. It is appreciated that each device 105 transmits request 140 at a given time and at a given frequency, stored in memory device 215, for example at "08:00" (i.e. 8am), "Daily". Hence, in the depicted example, if request 140 is requesting a back-up event, every morning at 8am data stored at device 105 is backed up at server 103. For example, in FIG. 2, device 105 stores data 250 in memory device 215, and server 103 stores a backup of data 250 for each device 105, respectively stored as data 250'a, 250'b, 250'c . . . 250'n (collectively data 250' and individually as data 250' and or a set of data 250') in memory device 125.

Ideally, transmission of requests 140 are temporally distributed, for example over a 24 hour period, so as distribute the load on server 103. However, each device 105 is generally unaware of a time that each other device 105 transmits a respective request 140. Furthermore, it is common for such requests 140 to occur during certain periods of a day, including but not limited to: in the morning when each device 105 is turned on; at a time that each device 105 was first activated; and at a time set as default value in each device 105. Hence, load on server 103 tends to be very high during certain periods of a day and extremely low during other periods. For example, in the example depicted in FIG. 1, the given time that each device 105 transmits request 140 is shown adjacent each device 105; in the depicted example each given time is the same: "08:00"; hence server 103 will be performing at least four concurrent events for each respective device 105 each day around 8am, and have excess capacity at other times of the day. Server 103 is hence capable of handling the load for the 8am peak period, the resources for handling the peak being unused the remainder to the day. In general, this can be both a waste of resources and expensive as server 103 then comprises a server with capacity and resources to handle the peak period, which then sit idle the remainder the remainder of the day). If requests 140 can be temporally distributed, server 103 can comprise a less expensive server with relatively lower capacity and relatively lower resources than a server enabled to process all requests 140 simultaneously.

While in some implementations, the given time and the given frequency can be set by at each device 105, in other implementations, the given time is set and stored at activation of a device 105 as a default value and/or as a factory setting, and only the given frequency can be set at a device 105. In some implementations, rules for transmission of request 140 can be set at a device 105, such as whether or not to transmit request 140 when roaming, to perform back-ups only when Wi-Fi access is available (assuming device 105 is Wi-Fi enabled), and the like, in order to save on bandwidth and/or costs associated with transmitting request 140 and/or data for backing up/synchronizing data 250.

In yet further implementations, the given time can change if the last given time occurs when device 105 is turned off: for example, if a given time is 02:00 (i.e. 2am), and device 105 is off at 02:00, the given time can be reset to the time that device 105 is next turned on, the underlying assumption in this implementation being that the device is not normally on at 02:00.

In any event, once a given time is stored at a device 105, it tends to be persistent such that a respective request 140 is transmitted at the same given time at the given frequency.

Elements of FIG. 1 are now described in further detail.

Each link 106 generally comprises a wireless link between each respective device 105 and server 103. Link 106 can hence comprise a wireless network, such as a wireless carrier network, including but not limited to any suitable cell phone network (1X, UMTS (Universal Mobile Telecommunications System), CDMA (code division multiple access), GSM (Global System for Mobile communications), 3G, EDGE, and the like), in combination with any suitable combination of wired or wireless networks as desired, including but not limited to a packet based network, the Internet, an analog network, the PSTN (public switched telephone network), a Wi-Fi network, a Wi-Max network and the like. However, in some implementations, one or more of links 106 can comprise any suitable combination of wired or wireless networks as desired, including but not limited to a packet based network, the Internet, an analog network, the PSTN, a Wi-Fi network, a Wi-Max network and the like. Furthermore, each of links 106 can be similar or different as desired.

Each device 105 can comprise any suitable electronic communication device and/or mobile computing device and/or mobile communication device, including but not limited to a laptop or notebook computer, a PDA, a cellular or mobile phone, a portable electronic device, or the like. However, other suitable types of electronic devices are within the scope of present implementations. For example, in some implementations, one or more of devices 105 can comprise a personal computer.

Server 103 comprises processing unit 122, communications interface 124 and memory device 125 all in communication, for example, via a computing bus (not depicted). Server 103 can include but is not limited to any suitable combination of a computer, a mainframe computer, a server and the like. Other suitable types of computing devices are within the scope of present implementations.

Processing unit 122 can comprise any suitable processor, or combination of processors, including but not limited to a microprocessor, CPU (central processing unit), or the like. Processing unit 122 can comprise a comparator 150 for comparing values including but not limited to comparing at least one tag 107 with tag filter data 130, and a calculator 152 for performing mathematical operations on numerical values and/or performing textual operations on text values.

Memory device 125 can be any suitable one of or combination of volatile memory, non-volatile memory, RAM, ROM, hard drive, optical drive, or the like. In particular, memory device 125 is enabled to store data 250'.

In alternative implementations, one or sets of data 250' can be stored in an optional database (note depicted) accessible to server 103, for example via a communication network and/or any suitable link. For example, in such an architecture, server 103 is enabled to manage events triggered by requests 140, but data 250' is stored at the optional database.

Communications interface 124 is enabled to communicate with devices 105 via links 106. Accordingly, communications interface 124 is enabled to communicate according to any suitable protocol which is compatible with links 106 including but not limited to packet based protocols, Internet protocols, analog protocols, cell phone protocols (1X, UMTS, CDMA, GMS, 3G, EDGE and the like), Wi-Fi protocols, Wi-Max protocols and/or a combination of these. Other suitable protocols are within the scope of present implementations.

Returning to FIG. 2, each of processing unit 212, communication interface 214, and memory device 215 can be respectively similar to processing unit 122, communication interface 124, and memory device 125 described above. Memory device 215 is enabled to store data 205 particular to the respective device 105. Interface 214 is enabled to communicate with server 103 via link 106. Device 105 also comprises an application 280 for causing requests 140 to be transmitted at the given time ("08:00") and given frequency ("Daily") and for enabling operations associated with events requested by requests 140. Application 140 can be stored in memory device 215 and processed by processing unit 212, for example when device 105 is turned on.

Display device 216 comprises circuitry 259 for generating representations of data, such as data 250, for example a representation 260, including but not limited to a visual representation, a video representation, and an audio representation, depending on data 250. Display device 216 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 259 can include any suitable combination of circuitry for controlling the CRT and/or flat panel displays etc., including but not limited to display buffers, transistors, electron beam controllers, LCD cells, plasmas cells, phosphors etc. In particular, display device 216 and circuitry 259 can be controlled by processing unit 212 to generate representation 260.

Input device 217 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Figure 3:
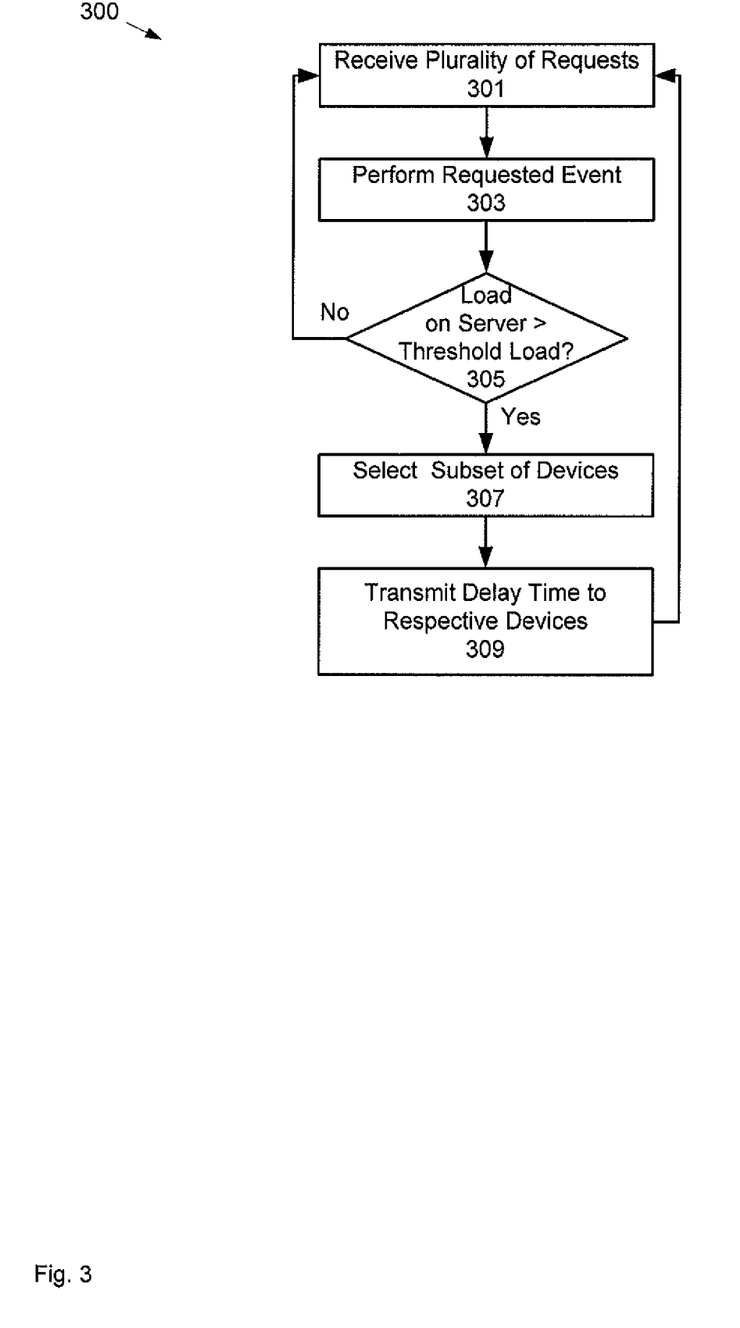
FIG. 3 depicts a flow chart of a method for managing load on a server, according to non-limiting implementations.

Attention is now directed to FIG. 3 which depicts a method 300 for managing load in a server. In order to assist in the explanation of method 300, it will be assumed that method 300 is performed using system 100. Furthermore, the following discussion of method 300 will lead to a further understanding of system 100 and its various components. However, it is to be appreciated that system 100 and/or method 300 can be varied, and need not work exactly as discussed herein in conjunction with each other, and that such variations are within the scope of present implementations.

Specifically, it is appreciated that method 300 can be implemented in server 103. It is further appreciated that server 103 is enabled to perform requested events for the plurality of devices 105, each of the plurality of devices 105 enabled to transmit to server 103, at a given time and at a given frequency, a request 140 to perform a respective event, including but not limited to a back-up event, a synchronization event or the like.

At step 301 a plurality of requests 140 are received at server 103. Each of the plurality of requests 140 request that server 103 perform a requested event. Furthermore, the plurality of requests 140 are received at server 103 from the plurality of devices 105 in a one to one relationship, as depicted in FIG. 1.

At step 303, the requested event is performed by server 103, for example a back-up event, a synchronization event or the like. In performing the requested event, any suitable amount of data can be exchanged between server 103 and each device 105 in order to updated data 205'. However, it is appreciated that step 303 can be performed at any suitable point in method 300, and further can be delayed when the load on server 103 is busy: in other words, requests 140 can be placed in a queue in any suitable order, (e.g. an order in which each request 140 is received, an order based on a priority of a request 140 and/or a device 105, or the like).

At step 305, it is determined if the load on server 103 is above a threshold load value during a given time period when the requests 140 arrive at server 103. Determining that load on server 103 is above a given threshold can comprises at least one of: determining that server 103 is busy in the given time period; determining that a number requests 140 arriving at server 103 in given time period is above a given threshold number; and determining that a percentage of resources used at server 103 in a given time period is above a given threshold percentage. The determination of the load can be performed via calculator 152, while the comparison can be performed via comparator 150.

The given time period can be any suitable time period, such as approximately 1 minute, approximately 5 minutes, approximately 15 minutes or the like, and can furthermore be dynamic: for example if method 300 is implemented at server 103 and it determined that load is regularly exceeded between 08:00 and 08:09 each morning, the given time period can be dynamically changed to 9 minutes.

The given threshold can be based on the capability of server 103. For example, if server 103 can process 1000 requests 140 at a time, then the given threshold is a given threshold number of 1000 requests 140.

The percentage of resources can also be determined based on the capability of server 103. For example, if 20% of the resources of server 103 are devoted to overhead (e.g. operating system, communications or the like), and a 10% buffer of free resources generally enables server 103 to operate efficiently, then the percentage of resources used can be 90% and/or 70% of resources used for processing requests 140 and/or requested events.

In any event, when the load is below the given threshold, step 301 is repeated. Otherwise when the load is above the given threshold, at step 307, a subset of devices 105 are selected. The subset of devices 105 can be selected by any suitable combination of: a given percentage of requests 140; randomly selected; selected according to a priority assigned to respective ones of requests 140 and/or devices 105; or any other suitable method. For example, in implementations depicted in FIG. 1, 75% of requests 140 can be randomly selected, for example requests 140n, 140b, 140c. For example, this assumes that the threshold load value is 1 request 140 in a 15-minute time period.

While in the example, 75% of requests 140 are selected, it is appreciated that 75% is non-limiting and any suitable percentage can be used. The suitable percentage can be based on the number of requests 140 received during a time period that is considered a peak time period and the resources available at server 103. For example, if server 103 can process 1000 requests 140 at a time, but 1250 requests 140 are received in a peak given time period, then it is desirable to reduce the number of requests by 20% during the next peak time period. In this instance, the percentage can be set to 20%.

Figure 4:
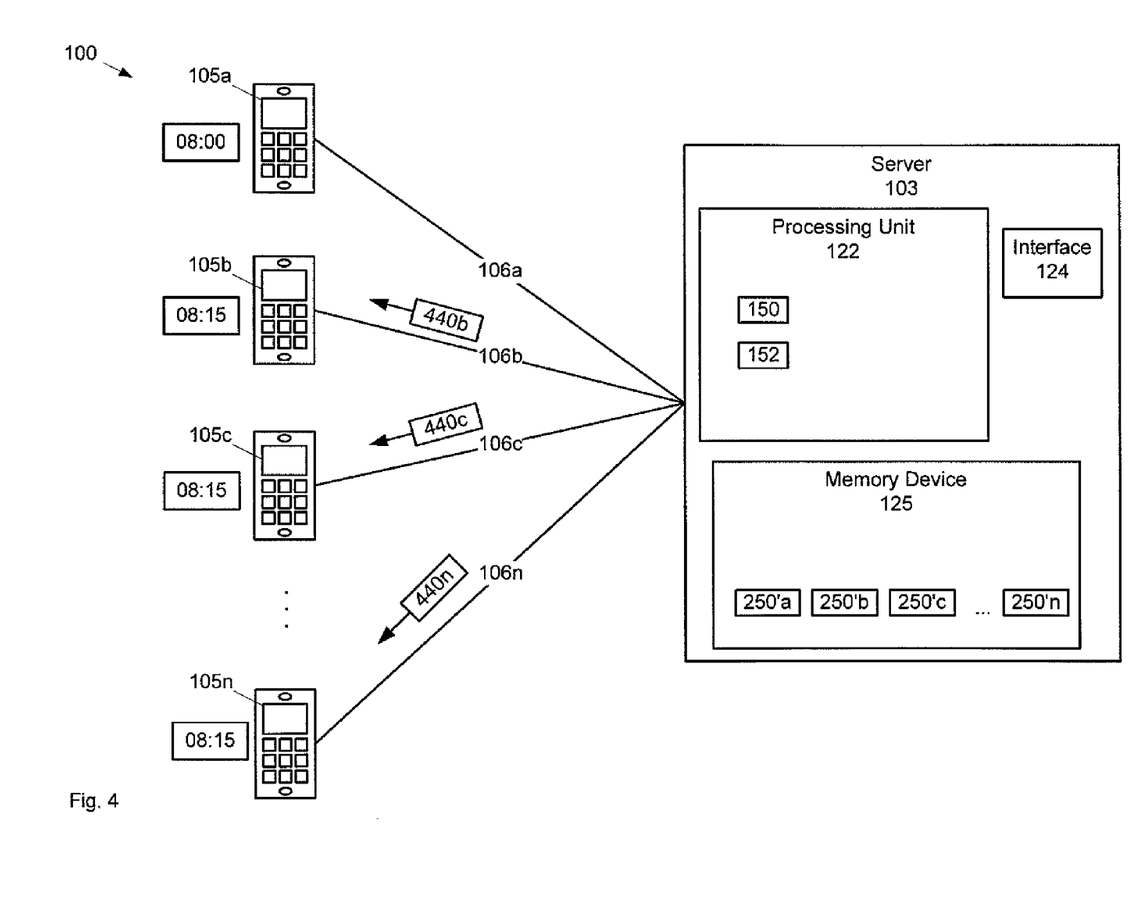
FIGS. 4 to 6 depict block diagrams of systems for managing load on a server, according to non-limiting implementations.

Then, for each request 140 in the subset, at step 309, and with further reference to FIG. 4, a delay time 440 is transmitted to respective devices 105. For example, in FIG. 4 (which is substantially similar to FIG. 1 with like elements having like numbers) and continuing with the above example, assuming that the subset selected at step 307 comprises requests 140n, 140b, 140c, a respective delay time 440n, 440b, and 440c (collectively delay times 440 and individually as a delay time 440) is transmitted to devices 105n, 105b and 105c, respectively.

Figure 7:
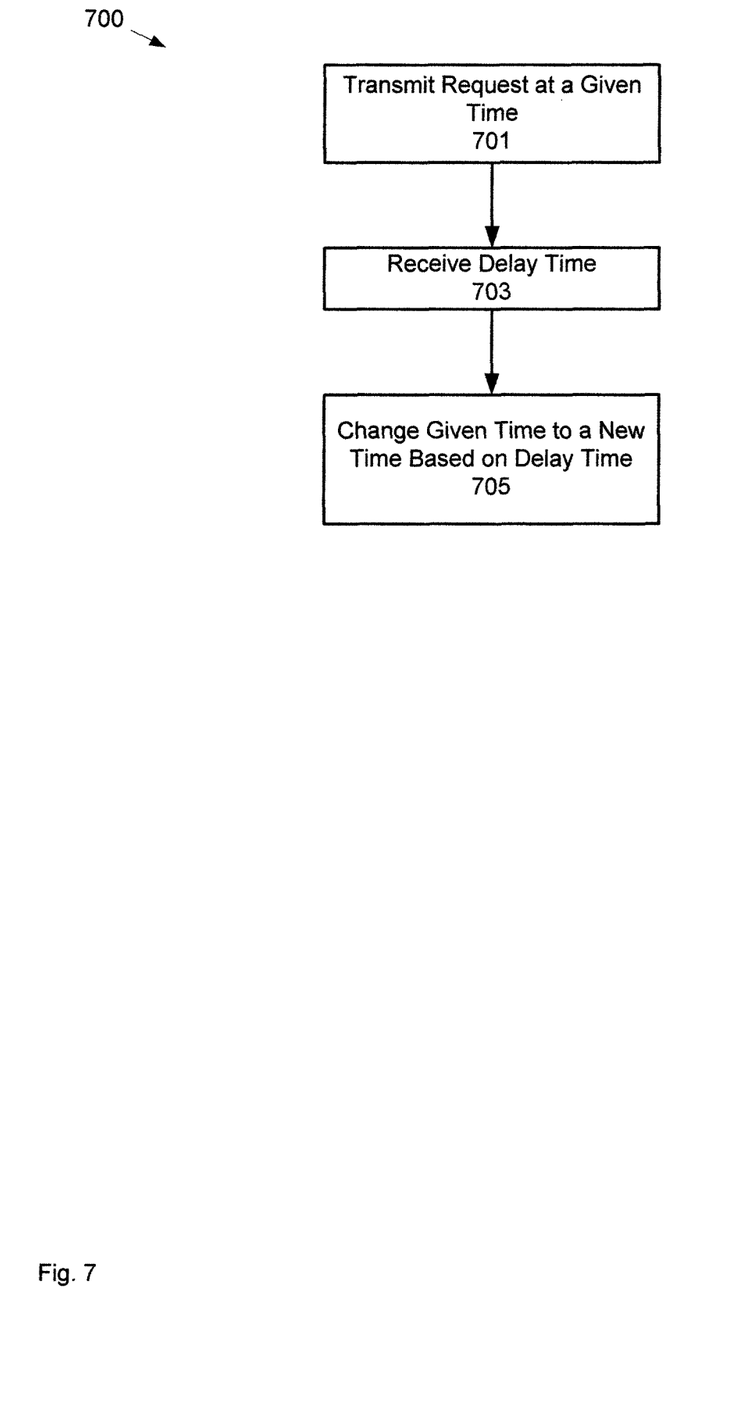
FIG. 7 depicts a flow chart of a method for managing load on a server by changing a time at which a request is transmitted to a server by an electronic communication device, according to non-limiting implementations.

Each delay time 440 causes the respective devices 105 to change their respective given time to a new time based on the delay time 440 such that a next request (similar to request 140) is transmitted from a device 105 to server 103 at the new time. The new time can comprise the delay time 440 added to the respective given time. However, in some embodiments, delay time 440 can comprise an absolute time (e.g. such as "8:15"), and the new time can be set to delay time 440, as described below. For example, attention is directed to FIG. 7, which depicts a method for changing the time at which a request 140 is transmitted to server 103. Method 700 can be implemented at each device 105. At step 701, a request 140 is transmitted to server 103. At step 703, delay time 440 is received once method 300 is implemented at server 103 and it is determined at step 305 that the load on server 103 is greater than a threshold load. At step 705 the given time at a device 105 is changed to a new time, the new time based on delay time 440. For example, the new time can be determined by adding the delay time to the given time. However, in yet further embodiments, at least one delay time 330 can be an absolute value, such as "8:15 am"; in these embodiments, the new time comprises the absolute value received in delay time 440.

Returning to FIG. 4 it is appreciated that each delay time 440 in the example provided in FIG. 4 is 15 minutes. Hence, when each delay time 440 is processed by each respective device 105, for example by implementing method 700 in each device 105b, 105c, 105n, the given time shifts from 08:00 to 08:15, as depicted. However delay time 440 of 15 minutes is not to be considered limiting and delay time 440 can be longer or shorter.

Indeed, each delay time 440 can be the same or different, and furthermore can be any suitable value. Indeed, the goal is to cause the time that requests 140 are transmitted by each device 105 to be distributed temporally to reduce the load on server 103 at peak periods. While in the depicted example, the delay time 440 is set to 15 minutes, the delay time 440 can be set to any value which causes devices 105 associated with the subset to move the time that requests 140 are transmitted to another given time period that is off-peak.

Indeed, delay time 440 can be a pre-determined value, for each request 140 in the subset, such as 15 minutes. However, each delay time 440 can be chosen from one of a plurality of values for each request in subset. For example, some delay times can be 15 minutes, while other delay times 440 can be 30 minutes. Yet further delay times 440 can be 45 minutes.

In yet further embodiments, at least one delay time 440 can be a delay value, such as 15 minutes, as described above. In other embodiments, at least one delay time 330 can be an absolute value, such "8:15am"; In these embodiments, server 103 takes a delay value (e.g. 15 minutes) and computes an absolute time (e.g. "8:15am"), and transmits the absolute time as delay time 440.

Furthermore, any suitable number of delay times 440 can be used, and further can be randomly assigned. In other embodiments, delay times 440 can be assigned based on any suitable priority scheme; non-limiting examples of priority schemes can include but are not limited to: assigning priority based on an identifier of a device 105; assigning priority based on a pre-assigned priority assigned to a device 105; assigning priority based on a preferred client status associated with a device 105, or the like.

In some implementations, delay time 440 can be positive such that the given time is moved forward (e.g. from 08:00 to 08:15). In other implementations, the delay time can be negative such that the given time is moved back (e.g. from 08:00 to 07:45). However, whether delay time 440 is positive or negative can depend on the time that delay time 440 is transmitted. For example, if delay time is transmitted in the morning, when devices 105 tend to be turned on after being off for the night, choosing a negative delay time 440 can be counter productive as at the new given time (e.g. 07:45), there is a chance that a device 105 can be off, and hence the given time will change to the time device 105 is next turned on. Hence, delay times 440 being negative can be limited to times of day when a device 105 is most likely to be on at the new time. Such a determination can be made based on statistical use of devices 105.

Furthermore, delay time 440 can be chosen dynamically, such that if peak periods for receiving requests lengthen or shorten, delay time 440 can be adjusted accordingly by server 440, prior to being transmitted to devices 440.

It is further appreciated that method 300 can be repeated any suitable number of times until the load on server 103 is reduced below the threshold load value.

Figure 5:
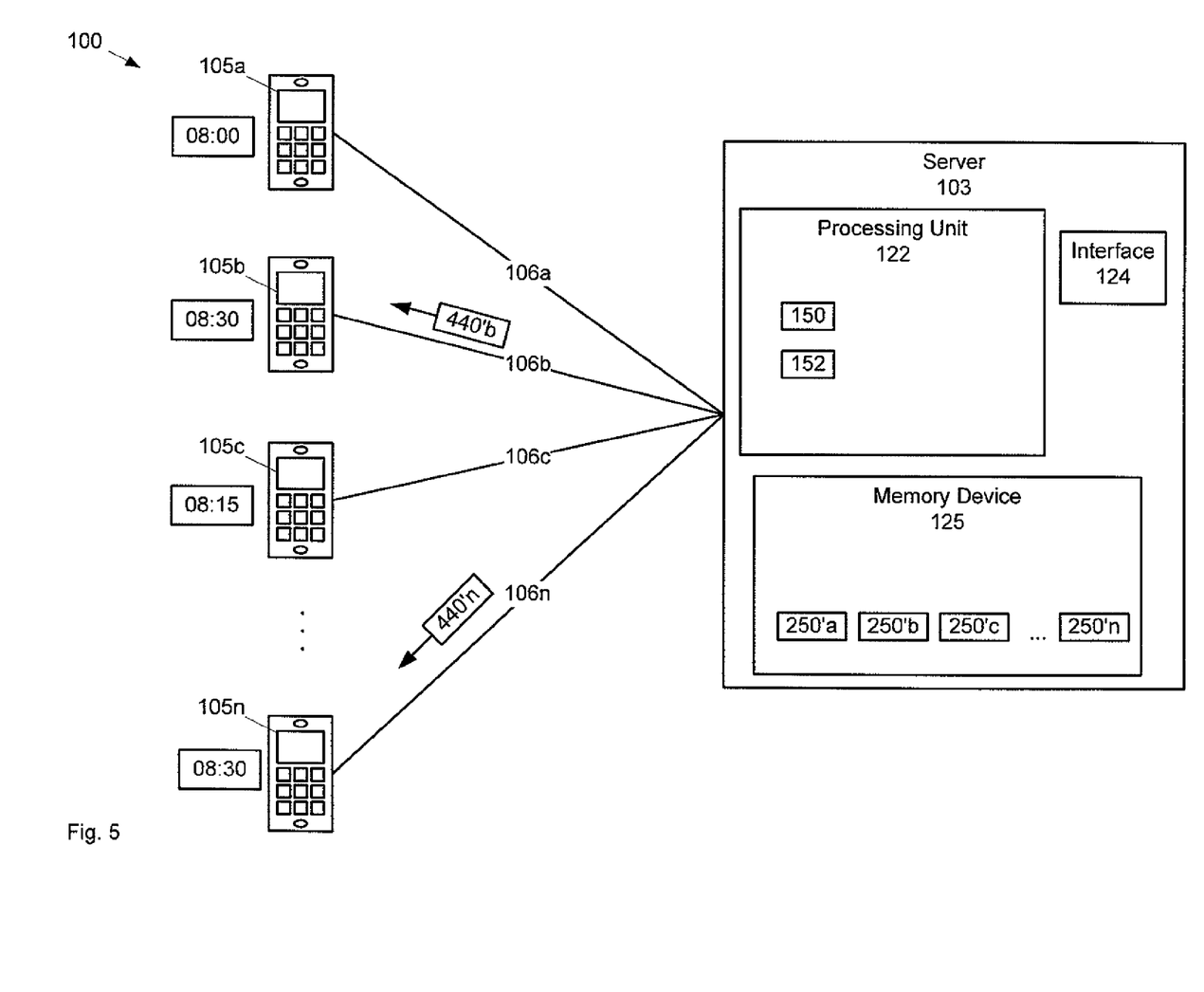

For example, requests 140 are transmitted at the given frequency. Assuming that method 300 is applied to system 300 when it is in the state depicted in FIG. 4, device 105a will transmit a request similar to request 140a, to server 103 at 08:00 the next day (i.e. frequency=daily). However, when step 303 is implemented, a determination will be made that the load on server 103 is below the threshold load. However, at 08:15, devices 105b, 105c, 105n transmit their respective requests, then at step 305, the determination can again be made that the load on the server is above the threshold load. Hence, a different subset of requests is selected at step 307, and step 309 is repeated. For example, requests associated with devices 105b and 105n can be selected (e.g. the subset is now 66% to bring the load at 08:15 to 1 request 140) and respective delay times 440'b and 440'n of 15 minutes can be transmitted as in FIG. 5 (substantially similar to FIG. 4 with like elements having like numbers) to devices 105b and 105n. As appreciated from FIG. 5, the given time stored at devices 105b and 105n changes to 08:30.

Figure 6:
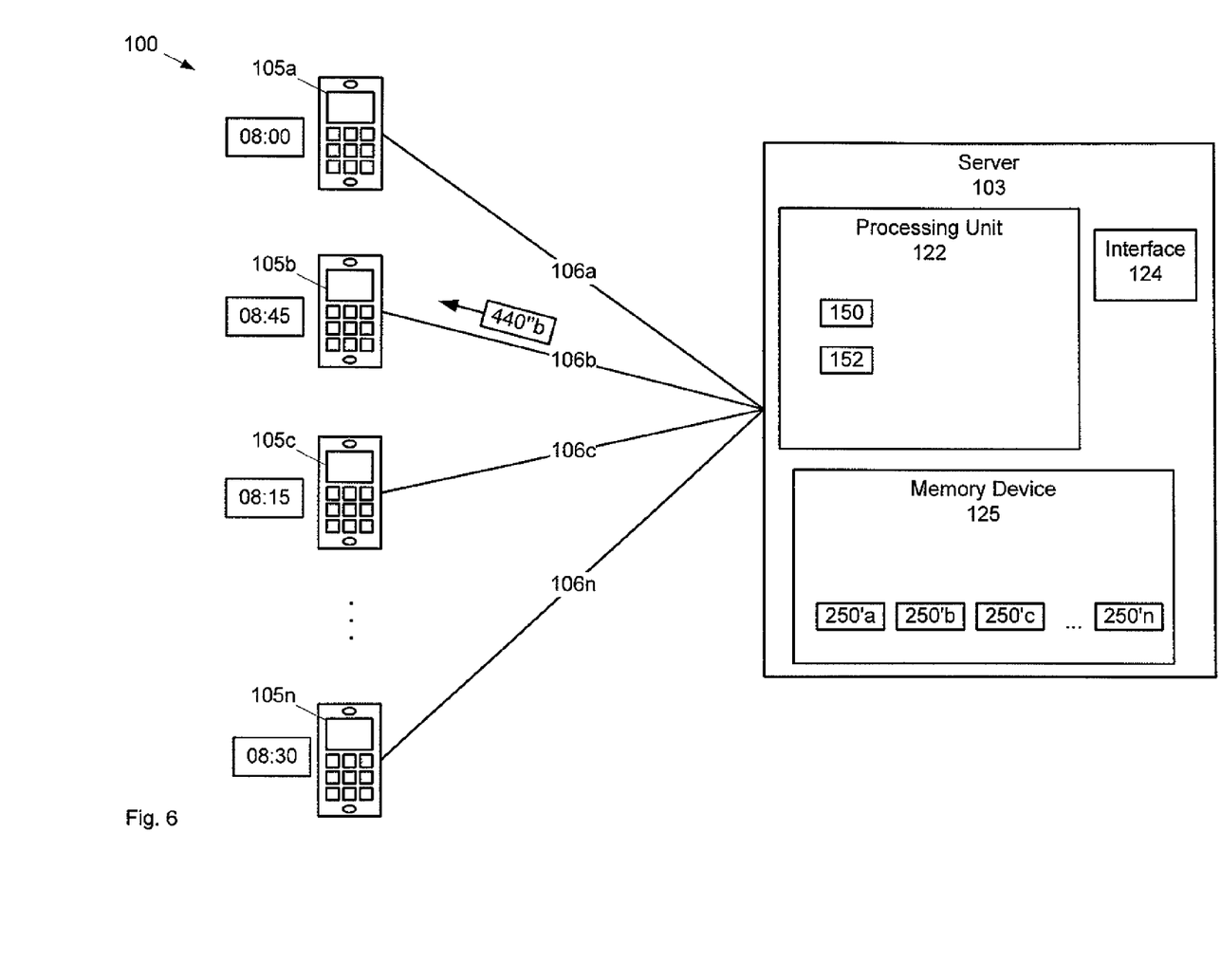

In the depicted example, method 300 can again be repeated the next day such that, as in FIG. 6 (substantially similar to FIG. 5, with like elements having like numbers), the subset is 50%, and a delay time 440"b of 15 minutes is transmitted to device 105b.

Further implementation of method 300 will not result in further changes to the given time at device 105 as the load on server 103 is now distributed such that the load is never more than 1 request 140 received in a given 15 minute period.

It is appreciated that a threshold load of 1 request in a given 15 minute period is merely exemplary and that in scaling up, server 103 can process many requests 140 in a given time period. Indeed, it is appreciated that method 300 can be scaled up so that server 103 can process hundreds to thousands of requests 140 over a 24 hour period (for example) and further cause hundreds to thousands of devices 105 to change their respective given times for transmitting respective requests 140, repeatedly, until the load on server 103 is distributed across a given period of time the load being below the threshold load value across a given period of time.

For example, each day, during peak periods, a delay time can be transmitted to a randomly selected 20% of devices 105. The random selection of devices 105 (and/or requests 140), and subsequent transmission of delay times 440 to the randomly selected devices 105 can be repeated each day until the load on server 103 is distributed.

Indeed, nominal calculations show that if an entity (e.g. a company or other organization) offers a daily back-up service to 20 million users, each having a device 105, then to accommodate peak periods wherein a large percentage of devices 105 back-up data 205, approximately 2000 servers would be used accommodate peak periods. However, if method 300 is implemented in such a system, the number of servers can be reduced to approximately 1000 servers as the load gets distributed over a 24 hour period. In other words, each day a percentage of the devices 105 are caused to migrate their back-up time from a busy period to a non-busy period the following day, until the load is distributed.

Those skilled in the art will appreciate that in some implementations, the functionality of devices 105 and server 103 can be implemented using pre-programmed hardware or firmware elements (e.g., application specific integrated circuits (ASICs), electrically erasable programmable read-only memories (EEPROMs), etc.), or other related components. In other implementations, the functionality of devices 105 and server 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method for managing load in a server enabled to perform requested events for a plurality of electronic communication devices, each of said plurality of electronic communication devices enabled to transmit to said server, at a respective given time and at a respective given frequency, a request to perform a respective event, said method implementable at said server, said method comprising:
   receiving a plurality of requests to perform said requested events from said plurality of electronic communication devices in a one-to-one relationship;
   selecting a subset of said plurality of electronic communication devices based on at least one of:
      selecting a percentage of said plurality of requests;
      randomly selecting; or
      selecting based on a priority assigned to at least one of said plurality of electronic communication devices;
   determining that said load on said server is above a threshold load value during a given time period when said plurality of requests are received at said server, said given time period occurring in a peak period for receiving the plurality of requests, wherein said determining that said load on said server is above said threshold load value comprises at least one of:
      determining that said server is busy in said given time period;
      determining that a number of said plurality of requests arriving at said server in said given time period is above a given threshold number; or
      determining that a percentage of resources in use at said server in said given time period is above a given threshold percentage;
   in response to said determining, transmitting a delay time to each of said subset of said plurality of electronic communication devices, said delay time causing each said electronic communication device in said subset to change said respective given time to a respective new time based on said delay time, such that a next request is transmitted from each said electronic communication device in said subset to said server at said respective new time, wherein said delay time comprises a given length of time and said new time comprises said delay time added to said respective given time, or said delay time comprises an absolute time value and said new time comprises said absolute time value; and,
   repeating said determining step and said transmitting step until said load is distributed across a second given period of time such that said load is below said threshold load value across said second period of time, said second given period of time being longer than said given period of time, said second given time period comprising the peak period and at least one off-peak period.

2. The method of claim 1, further comprising determining that said load on said server is below said threshold load value during said given time period, and in response not transmitting said delay time.

3. The method of claim 1, wherein said delay time is a same predetermined value for each said electronic communication device in said subset.

4. The method of claim 1, wherein said delay time is selected from, one of a plurality of values for each said electronic communication device in said subset.

5. The method of claim 1, wherein each of said requested events is associated with at least one of a backup event, a software update event or a synchronization event.

6. A system for managing load, comprising:
   a plurality of communication devices; and
   a server in communication with said plurality of communication devices, said server enabled to
      receive a plurality of requests to perform said requested events from said plurality of electronic communication devices in a one-to-one relationship;
      select a subset of said plurality of electronic communication devices based on at least one of:
         selecting a percentage of said plurality of requests;
         randomly selecting; or
         selecting based on a priority assigned to at least one of said plurality of electronic communication devices;
      determine that said load on said server is above a threshold load value during a given time period when said plurality of requests are received at said server, said given time period occurring in a peak period for receiving the plurality of requests, wherein to determine that said load on said server is above said threshold load value, said server is further enabled to at least one of:
 determine that said server is busy in said given time period;
 determine that a number of said plurality of requests arriving at said server in said given time period is above a given threshold number; or
 determine that a percentage of resources in use at said server in said given time period is above a given threshold percentage; and
in response to said determining, transmit a delay time to each of said subset of said plurality of electronic communication devices, wherein said delay time comprises a given length of time and said new time comprises said delay time added to said respective given time, or said delay time comprises an absolute time value and said new time comprises said absolute time value; and,
repeat said determine step and said transmit step until said load is distributed across a second given period of time such that said load is below said threshold load value across said second period of time, said second given period of time being longer than said given period of time, said second given time period comprising the peak period and at least one off-peak period,
wherein each of said plurality of communication devices is enabled to
 transmit a respective request to said server to perform a respective requested event at a respective given time and at a respective given frequency;
 in response to transmitting said respective request, receive a respective delay time from said server; and
 change said respective given time to a respective new time based on said respective delay time such that all further requests transmitted to said server occur at said respective new time.

7. A server for managing load, the server comprising:
a processing unit interconnected with a communications interface and a enable, said processing unit enabled to:
receive a plurality of requests, via said communications interface, to perform said requested events from said plurality of electronic communication devices in a one-to-one relationship;
select a subset of said plurality of devices based on at least one of:
 selecting a percentage of said plurality of requests;
 randomly selecting; or
 selecting based on a priority assigned to respective ones of said plurality of electronic communication devices;
determine that said load on said server is above a threshold load value during a given time period when said plurality of requests are received at said server, said given time period occurring in a peak period for receiving the plurality of requests, wherein to determining that said load on said server is above said threshold load value, said processor is further enabled to at least one of:
 determine that said server is busy in said given time period;
 determine that a number of said plurality of requests arriving at said server in said given time period is above a given threshold number; or
 determine that a percentage of resources in use at said server in said given time period is above a given threshold percentage;
in response to said determining, transmit a delay time to each of said subset of said plurality of electronic communication devices, said delay time causing each said electronic communication device in said subset to change said respective given time to a respective new time based on said delay time such that a next request is transmitted from each said electronic communication device in said subset to said server at said respective new time, wherein said delay time comprises a given length of time and said new time comprises said delay time added to said respective given time, or said delay time comprises an absolute time value and said new time comprises said absolute time value; and,
repeat said determine step and said transmit step until said load is distributed across a second given period of time such that said load is below said threshold load value across said second period of time, said second given period of time being longer than said given period of time, said second given time period comprising the peak period and at least one off-peak period.

8. The server of claim 7, wherein said processing unit is enabled to determine that said load on said server is below said threshold load value during said given time period, and in response not transmit said delay, time.

9. The server of claim 7, wherein said delay time is a same predetermined value for each said electronic communication device in said subset.

10. The server of claim 7, wherein said delay time is selected from one of a plurality of values for each said electronic communication device in said subset.

11. The server of claim 7, wherein each of said requested events comprises at least one of a backup event, a software update event or a synchronization event.

12. A computer program product, comprising a non-transitory computer usable medium having a computer readable program code adapted to be executed to implement a method for managing load in a server enabled to perform requested events for a plurality of electronic communication devices, each of said plurality of electronic communication devices enabled to transmit to said server, at a respective given time and at a respective given frequency, a request to perform a respective event, said method implementable at said server, said method comprising:
receiving a plurality of requests to perform said requested events from said plurality of electronic communication devices in a one-to-one relationship;
selecting a subset of said plurality of electronic communication devices based on at least one of:
 selecting a percentage of said plurality of requests;
 randomly selecting; or
 selecting based on a priority assigned to at least one of said plurality of electronic communication devices;
determining that said load on said server is above a threshold load value during a given time period when said plurality of requests are received at said server, said given time period occurring in a peak period for receiving the plurality of requests, wherein said determining that said load on said server is above said threshold load value comprises at least one of:
 determining that said server is busy in said given time period;
 determining that a number of said plurality of requests arriving at said server in said given time period is above a given threshold number; or
 determining that a percentage of resources in use at said server in said given time period is above a given threshold percentage;
in response to said determining, transmitting a delay time to each of said subset of said plurality of electronic communication devices, said delay time causing each said electronic communication device in said subset to change said respective given time to a respective new time based on said delay time, such that a next request is transmitted from each said electronic communication device in said subset to said server at said respective new time, wherein said delay time comprises a given length of time and said new time comprises said delay time added to said respective given time, or said delay time comprises an absolute time value and said new time comprises said absolute time value; and, repeating said determining step and said transmitting step until said load is distributed across a second given period of time such that said load is below said threshold load value across said second period of time, said second given period of time being longer than said given period of time, said second given time period comprising the peak period and at least one off-peak period.

* * * * *